United States Patent Office 3,043,952
Patented July 10, 1962

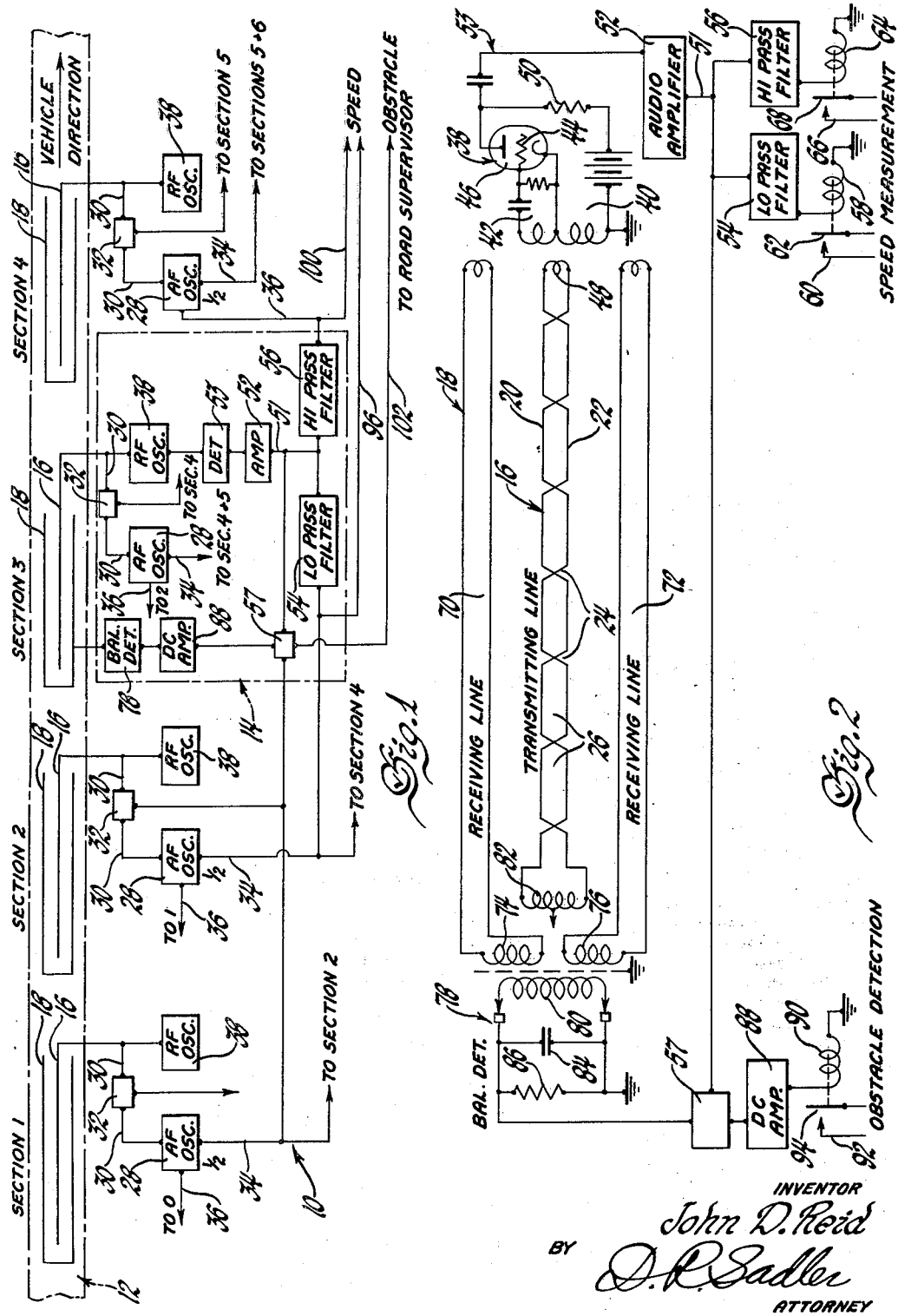

3,043,952
AUTOMATIC CAR GUIDANCE SYSTEM
John D. Reid, Little Rock, Ark., assignor to General Motors Corporation, Detroit, Mich., a corporation of Delaware
Filed Sept. 8, 1958, Ser. No. 759,522
9 Claims. (Cl. 246—182)

The present invention relates to vehicles and, more particularly, to means for automatically controlling each vehicle in a series traveling on a roadway.

In the past numerous attempts have been made to devise means for automatically controlling one or more vehicles traveling on a roadway. It is the objective of such systems to provide a completely automatic operation and to relieve the driver or operator of the necessity of assuming any control over the vehicle. This will not only relieve the operator of a burdensome task but will also permit the vehicles to safely operate at higher speeds and in closer proximity to each other, thereby permitting greater utilization of the roadway. Although there have been some systems which are capable of automatically steering a vehicle along a predetermined path and/or automatically regulating the speed of the vehicle, these systems have not been entirely satisfactory for use on high-speed vehicles traveling on public roadways in close proximity to each other. The foregoing systems have been unable to reliably and accurately detect the presence of any obstacles such as stalled vehicles or miscellaneous objects located in the path of the controlled vehicle and, accordingly, have required the attention of the operator to avoid accidents. As a result their use has been confined to controlling slow moving vehicles such as employed in material handling systems wherein the consequences of a vehicle striking an obstacle would be minor.

In the event a system for automatically controlling automotive vehicles, etc. is installed on a public roadway, not all of the vehicles will be equipped with automatic controls. Thus, only a portion of the vehicles will be controlled by the system. The remaining portion will be manually controlled and will be traveling at a wide variety of speeds. Accordingly, any system for automatically controlling high-speed vehicles must be capable of detecting and signaling the presence of any vehicles which are not operating in the prescribed manner, i.e., traveling below or above the command speed etc. None of the foregoing systems for controlling vehicles have embodied any effective and reliable means of detecting the presence of moving vehicles and modifying the operation of the controlled vehicle in the event the moving vehicle presents an obstacle to the controlled vehicle. It should be noted that a vehicle which is traveling at command speed will not present an obstacle to another vehicle traveling at command speed. The system does not need to modify the speed of any automatically controlled vehicles following another vehicle traveling at command speed.

It is now proposed to provide a system capable of automatically controlling a plurality of high-speed vehicles traveling along a roadway in close proximity to each other without requiring any attention of the operator or driver. More particularly, this is to be accomplished by providing a control system in which the roadway is subdivided into sections or blocks with each section having a separate control cable or transmission line arranged to define the center line of the path over which the vehicles will travel and to supply information to the vehicle to control the operation thereof. Any automatically controlled vehicles are equipped with means for sensing the radiations from the control cable and steering the vehicle and regulating the speed thereof in response to the information contained in the signal radiated from the transmission line.

In addition, a pair of receiving lines are disposed in some predetermined pattern about the transmission line to receive the radiations therefrom. The receiving lines are preferbaly located adjacent the borders of the path the vehicle is following so as to receive the radiations from the transmission line and produce signals proportional to the received radiation. Normally, there will be no obstacles in this path and the signals received by the pair of receiving lines will be balanced. As a result, in the absence of an obstacle, there will be no output from the receiving lines. However, if an obstacle is located in the path of an oncoming vehicle, it will effect the respective amounts of radiations received by the receiving lines and the received signals in the receiving lines will no longer be balanced. This unbalanced condition will cause an output signal that will be effective to produce an indication of the presence of an obstacle. This indication may be effective to modify the information in the transmission line and to thereby control any oncoming vehicles to avoid an accident.

In addition, speed measuring means are provided for determining the speed of any moving objects on the path and indicating whether they are traveling at a sufficiently low or high speed to form an obstacle that is a potential hazard to the automatically controlled vehicles. The speed of the objects is determined by measuring the Doppler shift in the frequency of a signal radiated by the cable to the object and reradiated back to the cable. If the detected vehicle is moving at command speed, the Doppler shift will be a predetermined amount. However, in the event the vehicle is not traveling at command speed, the Doppler shift will differ from this predetermined amount. This abnormal frequency shift will be an indication of a hazardous condition and may be utilized to actuate suitable control means that will modify the operation of all controlled vehicles in the hazardous areas so as to avoid a collision.

In the drawing:
FIGURE 1 is a block diagram of a control system embodying the present invention.
FIGURE 2 is a diagram of a portion of the foregoing system.

Referring to the drawing in more detail, the present invention is particularly adapted for use in a system 10 that automatically controls the operation of each vehicle in a series of vehicles traveling along a roadway 12.

In the present system, the roadway 12 is subdivided into a plurality of separate blocks or sections 1, 2, 3 and 4, all of which are substantially identical to each other and include a central control center 14 as well as a control cable or transmission line 16 and receiving lines 18 that are buried beneath the surface of the roadway. It should be noted that since all the sections are identical, only those portions of sections 1, 2 and 4 that are directly interconnected with section 3 are shown in FIGURE 1.

The control cable 16 is preferably arranged to define the center line of the path the vehicles are to follow and includes a transmission line consisting of two electrical conductors 20 and 22 for carrying the various electrical currents. However, if desired the various electrical currents may be carried by a greater number of conductors. The two electrical conductors 20 and 22 forming the present transmission line 16 are equally spaced from and parallel to each other except at a plurality of substantially equally spaced crossover points 24 where the two conductors 20 and 22 cross each other. Thus, the transmission line 16 will be divided into a plurality of substantially identical loops 26. Consequently, any current in the conductors 20 and 22 will form an electromagnetic flux field consisting of zones of reversed polarity separated by points 24 having little or no flux density. The input end of the the transmission line 16 is interconnected with a low frequency or audio oscillator 28 by means of a conductor 30 having a normally closed switch 32 therein. The frequency of the oscillator 28 is preferably in the audio range and capable of being reduced by applying an appropriate signal to an input 34 and of being increased by applying an appropriate signal to a second input 36. The current from this audio oscillator 28 will thus cause an alternating electromagnetic flux field to be radiated above the surface of the roadway 12 consisting of zones of reversed polarity and having a frequency corresponding to the frequency of the audio oscillator 28.

Any vehicles that are equipped to follow the control cable 16 and be automatically controlled thereby will preferably include one or more pickup units that are mounted on the vehicle so as to be disposed in the alternating electromagnetic field radiated from the cable 16 and have a voltage induced therein. This voltage will have a frequency corresponding to the frequency of the oscillator 28 and will have an amplitude, phase and/or polarity dependent upon the position of the pickup relative to the control cable 16. This voltage signal may be supplied to a servo positioning system that actuates the vehicle power steering system. Consequently, the voltage signal may be made effective to guide the vehicle along the path defined by the cable 16 and maintain the pickup centered thereover.

The voltage signal received by the pickup unit will be responsive to the intensity of the field radiated from the transmission line 16. Accordingly, the strength of the signal will vary as the pickup travels from a zone of one flux density past a crossover point 24 and into an adjacent zone of a flux of reversed polarity. This, in turn, will cause the signal sensed by the pickup unit to be modulated at a frequency indicative of the speed the vehicle is traveling along the transmission line 16. Information as to the command speed or the speed at which the vehicle is required to travel in the section may be supplied to the vehicle by a suitably coded current carried in the transmission line 16. For example, the frequency of the current supplied by the audio oscillator 28 may be proportional to the command speed. Thus a servo system may be operatively interconnected with the vehicle throttle control for regulating the speed of the vehicle. This servo will be effective to compare the vehicle speed signal and the command speed signal and adjust the engine output to maintain the vehicle speed at the command speed prescribed for the section.

It will be seen that the foregoing system 10 will be effective to direct a series of vehicles along the roadway at a predetermined command speed in substantially the same manner as the system described and claimed in copending application S.N. 756,827 to Mountjoy, filed August 25, 1958. Normally, this is all that is required. However, there may be stationary obstacles such as stalled vehicles, etc. present on the roadway. In addition, there may be vehicles present on the roadway 12 which are not controlled by the system 10 but instead are manually controlled by an operator in the vehicle. As a result they will not necessarily be traveling at command speed but instead may be traveling above or below this speed. Any of these conditions are potentially hazardous since, if any automatically controlled vehicles continue to travel at the prescribed speed, a collision may result between the controlled vehicle and the stationary and/or moving obstacles. Accordingly, the present system 10 also includes additional means that are effective to detect any of the foregoing hazardous conditions and cause appropriate indications thereof and automatically modify the operation of any automatically controlled vehicles approaching the obstacle so as to avoid an accident.

More particularly, this is accomplished by providing a high or radio frequency oscillator 38 that supplies a high frequency current to the input end of the transmission line 16 to supplement the audio frequency current. This radio frequency oscillator 38 may be of any suitable type that can supply a signal of sufficiently high frequency and which is sufficiently stable to be free from excessive drifting. In the present instance the high frequency oscillator 38 is illustrated as comprising an inductive feedback circuit 40 which has a tuned tank circuit 42 connected to the control grid 44 of a vacuum tube 46. The input end of the transmission line 16 is inductively coupled to the feedback circuit by means of a coil 48. Thus the transmission line 16, in addition to the audio frequency current, will also carry a current having a high frequency corresponding to the frequency of the radio frequency oscillator. Accordingly, in addition to the electromagnetic field, there will also be a high frequency field radiated above the surface of the roadway 12.

Any vehicle that is traveling along the controlled path will be disposed within this high frequency field and any metallic portions of the vehicle will be excited thereby. If the vehicle is stationary, the frequency of the excitations will be equal to the frequency of the field. However, if the vehicle is moving toward the input end of the transmission line 16, it will "capture" extra cycles of the radiations at a rate dependent upon the frequency in the transmission line 16 and also upon the speed of the vehicle relative to the line 16. As a result of this Doppler effect, there will be an upward shift in the frequency of the excitations of the vehicle and the amount of the frequency change will be indicative of the speed of the vehicle.

The excitations of the vehicle will cause a second signal to be reradiated therefrom at a frequency corresponding to the frequency of the excitations. This reradiated signal will strike the transmission line 16 and be received thereby. However, due to the relative movement between the vehicle and the line 16, there will be a second Doppler effect that will again cause an upward shift in the frequency of the signal received by the transmission line 16. The amount of the second upward shift will also be a function of the speed of the vehicle.

Thus, in addition to the original high frequency current supplied to the transmission line 16 by the high frequency oscillator, there will also be a second signal that will have an even higher frequency that has been doubly shifted upwardly due to the cumulative Doppler effects. As a result, the doubly shifted signal will be inductively coupled from the input end of the transmission line 16 into the tank circuit 42 of the high frequency oscillator 38. The combining of the received signal with the original oscillations will produce a beat frequency equal to the difference therebetween, or in other words, equal to the amount of the double shifting. Consequently, the frequency of the beat will represent the speed of the vehicle.

The beat frequency will be impressed upon the control grid 44 of the tube 46 and amplified thereby and appear across the plate load 50. The plate circuit is coupled to an amplifier 52 by a condenser and/or detector circuit 53 which preferably filters out the higher frequency oscillations and supplies only the beat frequency signal to the input of the amplifier 52. By employing a radio frequency oscillator 38 having a sufficiently high frequency, the speeds at which trucks, automobiles, etc. travel will normally produce a cumulative amount of frequency shifting that will create a beat frequency in the audio range. Accordingly, the amplifier 52 may be of conventional audio design.

The output 51 of the amplifier 52 is interconnected with an input to a low pass filter 54 and to an input to a high pass filter 56 to thereby feed the amplified beat signal thereto. The output 51 is also interconnected with a switch 57, the operation of which will be described later. The low pass filter 54 preferably has a sharp cut-off point that is substantially equal to the frequency that would be produced by a vehicle traveling at command speed. Thus the filter 54 will be effective to block or suppress those frequencies equal to or higher than those produced by a vehicle traveling at command speed and to pass only those signals which have a lower frequency. The output of this filter 54 is interconnected directly with a relay 58 that controls a switch 60 having a set of normally open contacts 62. The high pass filter 56 may be similar to the low pass filter 54 in that it also has a sharp cut-off point that is substantially equal to the command speed frequency. Thus this filter 56 will block or suppress those frequencies equal to or lower than those produced by a vehicle traveling at command speed and to pass only those signals which have a higher frequency. The output of this filter 56 is interconnected directly with a second relay 64 that actuates a second switch 66 having a set of normally open contacts 68.

It may be seen that if a vehicle is traveling along the roadway 12, it will progress along the control cable 16, and as a result of the high frequency field radiated therefrom, will produce a beat frequency signal in the transmission line 16 that is indicative of the vehicle speed. This beat signal will be amplified by the oscillator tube 46 and coupled into the amplifier 52. This amplifier 52 will amplify the beat signal and feed it into the high pass filter 56 and the low pass filter 54. If the vehicle is traveling at command speed, the frequency of the beat signal will be equal to the cut-off points of the two filters. As a result, neither filter will pass a signal and the relays 58 and 64 will not be energized. Consequently, the contacts 62 and 68 in both of the relay switches 60 and 66 will remain open and no indication will be made of the presence of this vehicle. It should be noted that such a vehicle will be traveling at the same speed as the automatically controlled vehicles and, accordingly, will not present any form of hazardous obstacle thereto. It is therefore not considered necessary to indicate the presence of this vehicle as to modify the operation of the automatically controlled vehicle.

If a vehicle traveling at less than command speed enters a section, the resultant beat frequency in the transmission line 16 will be less than the desired amount. This lower beat frequency will be coupled out of the radio frequency oscillator 38 and into the amplifier 52 where it will be detected and amplified. The resultant signal will then be fed into the high pass filter 56 and the low pass filter 54. Since the beat frequency will be less than the cut-off frequency of the high pass filter 56, the relay 64 will not be energized and the contacts 68 will remain open. However, since the beat frequency is below the cut-off point of the low pass filter 54, a signal will pass through the filter 54 and energize the relay 58. This, in turn, will close the contacts 62 of the switch 60 and provide a suitable indication and/or modify the control system 10 to prevent an accident with the potentially hazardous slow moving vehicle.

Conversely, if a high speed vehicle is traveling along the roadway 12 the beat frequency fed into the amplifier 52 will be above the desired amount, i.e. the cut-off frequency of the filters 54 and 56. As a result, the low pass filter 54 will not pass any signal and the contacts 62 of switch 60 will remain open. However, the high pass filter 56 will pass a signal and energize the relay 64. This will close the high speed contacts 68 to thereby provide and appropriate warning and/or modification of the control system 10.

In order to detect the presence of any stationary obstacles such as a stalled vehicle or debris located on the roadway 12 and in the path of an oncoming vehicle, a network of receiving lines 18 are buried beneath the surface of the roadway 12. These receiving lines 18 will be disposed in the field from the transmission line 16 and, consequently, will act as antennas to receive the radio frequency radiations therefrom. In the present instance the network of receiving lines 18 includes two pairs 70 and 72 of conductors that are arranged along the opposite borders of the path the vehicles will follow. The conductors in each pair 70 and 72 are paralleled to, but spaced from, each other with the output ends terminating in inductive coils 74 and 76. These coils 74 and 76 are, in turn, inductively coupled to the inductive input of a balanced detector 78. Thus, the radiations from the transmission lines 16 will create a signal in the coil 80 of the detector 78. The amount of signal fed into the detector coil 80 by the receiving line 70 is preferably exactly equal to and opposed to the voltage normally fed from the line 72. As a result, the total voltage across the coil 80, and an output resistor 86, will be substantially zero. However, in the event an object is disposed within the radiated field, it will affect the amount of signal received by lines 70 and 72 and will change the balanced condition of the signal fed into the detector 78. A condenser 84 may be disposed across the coil 80 so as to be charged in proportion to the total amount of voltage across the input coil 80. The voltage across the resistor 86 is fed into the switch 57. This switch 57 is normally closed. However, in the event there is an output from the amplifier 52, the switch 57 will be open. The switch 57 is connected directly into a D.C. amplifier 88. The output of the amplifier 88 is, in turn, connected to the coil of a relay 90 which controls a switch 92 having a set of normally open contacts 94.

It may thus be seen that in the absence of any obstacles on the roadway 12, the signals received by the pairs 70 and 72 of receiving conductors and supplied to the detector input coil 80 will be balanced. As a result, the total voltage across the output resistor 86 will be negligible and no charge will accumulate on the condenser 84. The D.C. amplifier 88 will therefore receive no signal and the contacts 94 of the relay controlled switch 92 will remain open.

However, in the event an object is located on the roadway 12 the radiations from the transmission line 16 to the receiving lines will be unbalanced as between the receiving lines. This will produced a corresponding change in the signals coupled into the coil 80 of the detector 78 from the receiving lines. Consequently, the signals in the input coil 80 will no longer be balanced and a voltage will result across the output resistor 86 that will be fed into the D.C. amplifier 88. The amplifier 88 will then energize the relay 90 and close the contacts 94 to indicate the presence of the obstacle.

*Operation*

If there are no vehicles or obstacles present on the roadway 12, all of the various audio oscillators 28 in each section 1, 2, 3 and 4 will be oscillating at the command frequency and supplying a control signal to the transmission line 16 to thereby radiate the electromagnetic field above the surface of the road 12. At the same time the radio frequency oscillators 38 in each section 1, 2, 3 and 4 will also be supplying a signal to the transmission line 16 to thereby radiate the high frequency field above the surface of the roadway. The receiving lines 18 will be subject to the high frequency radiations and will be receiving equal signals therefrom. Consequently, the D.C. amplifier 88 will not receive any signal and the relay contacts 94 will remain open. In addition, there wll be no beat frequency in the transmission line 16 and the low pass and high pass filters 54 and 56 will receive no signals. Therefore the relay switch contacts 62 and 68 will remain open but the switch 32 will be closed.

If a vehicle is proceeding along the roadway 12 at the prescribed command speed, it will progress from section to section until it passes through sections 1, 2 and enters into section 3. During this process the pickup means on the vehicle will be receiving the electromagnetic radiations from the transmission lines 16 and will guide the vehicle along the path at the command speed indicated by the frequency of the audio oscillators 28. When the vehicle moves along the control cable 16, the high frequency radiations therefrom will excite the vehicle and be re-radiated back to the transmission line 16. Also, the signals received by the receiving lines 18 will be altered. The re-radiated signal in the transmission line 16 will be double shifted in frequency due to the cumulative Doppler effects and will produce a beat frequency signal. This signal will be amplified by the amplifier 52 and fed to the switch 32 and into the filters 54 and 56. Since the beat frequency will be equal to command freqeuncy, no signal will pass through either filter 54 or 56 and the relays 58 and 64 will not be energized. Therefore, the contacts 62 and 68 will be maintained open and no indication of the presence of this vehicle will be made at the central control section, and, moreover, the command signals of the system 10 will not be modified. Consequently, other automatically controlled vehicles can continue to operate in a normal manner. It should be noted that although the presence of the vehicle will unbalance the signals from the receiving lines 18, the output from the amplifier 52 will be effective to open the switch 57. Thus, even though there will be a signal from the detector 78, the relay 90 will not be energized and no indication will be made of a stationary obstacle.

In the event a vehicle is proceeding along the roadway 12 at less than the prescribed command speed, when it enters section 3 it will cause a beat frequency to be produced in the transmission line 16 and to unbalance the signals from the receiving lines 18. The beat frequency, which will now be below the command frequency, will be amplified by the amplifier 52 and simultaneously fed to the switch 57 and the filters 54 and 56. Since the vehicle is traveling at less than command speed, the high pass filter 56 will not energize the high speed relay 64. However, the low pass filter 54 will pass a signal to the slow speed relay 58. This will energize the slow relay 58 and close the contacts 62 of the switch. Closing these contacts 62 will energize a control line 96 leading to the low frequency input 34 to the audio oscillator 28 in the preceding section 2 and also leading to the central control. Consequently, a signal will be impressed on the input 34 of the audio oscillator 28 and reduce the frequency thereof. Although the reduction may be by any amount in the present instance the frequency is arbitrarily reduced by one half to thereby reduce the command speed for section 2 to one half its normal amount. Thus, if an automatically controlled vehicle is traveling along the roadway at command speed and is overtaking the slow vehicle, its speed will be cut in two when it enters section 2. This will prevent the following vehicle from overrunning the slow-moving vehicle. The drastic reduction in speed of the vehicle will be readily apparent to the vehicle operator and he may assume control of the vehicle by taking any action he desires; for example, passing the slower vehicle. It should be noted that the signal of a slow-moving vehicle may be effective to control a larger number of preceding sections and/or to more extensively modify the speeds of any following vehicles, if desired. Energizing the control line 96 leading to the central control station will provide an indication so that the road supervisor can dispatch personnel to quickly eliminate the hazardous vehicle. It is, of course, apparent that the beat frequency signal from the amplifier 52 will be effective to open the switch 57 and prevent an indication of a stationary obstacle.

In the event a high speed vehicle proceeds along the roadway 12 and enters into section 3, a higher beat frequency will be set up in the transmission line 16 and the beat frequency will be amplified by the amplifier 52 and fed into the filters 54 and 56. Although the signals from the receiving lines 18 will be unbalanced, the output of the amplifier 52 will open the switch 57. The frequency of the signal will be in excess of the command frequency and will be blocked by the low pass filter 54, but will be passed by the high pass filter 56. This will energize the relay 64 and close the contacts 68 for a control line 100 leading to the high frequency input 36 to the audio oscillator 28 in the succeeding section 4 and also to the central control station. This will speed up the leading vehicle to prevent its being overtaken by the high speed vehicle. Also, an indication will be made to the road supervisor so that personnel can be dispatched to slow down the high speed vehicle.

If a stationary obstacle such as a stalled vehicle is located anywhere in section 3 and in the path of the vehicle, the radiations from the transmission line 16 to the receiving lines 18 will be effected. Thus, the signals present in the detector coil 80 will no longer be balanced. Accordingly, a voltage will appear across the output resistor 86. This voltage will be fed into the D.C. amplifier 88. The amplifier 88 will then have an output current that will be effective to energize the relay 90 and close the contacts 94. Since the obstacle is stationary, there will be not beat frequency signal present in the transmission line 16. As a result there will be no output from the amplifier 52 and the switch 57 will remain closed. Accordingly, closing the contacts 94 will be effective to energize a control line 102 leading to the switch in preceding section 2 and the low frequency input of the audio amplifier 52 in section 1 and to the central control section.

When the signal is applied to the low frequency input of the audio amplifier 52 in section 1, the frequency of the audio oscillator 28 will be reduced by one half. In addition, opening the switch 32 in section 2 will remove the audio command signal from the transmission line 16 in section 2. This will, in effect, reduce the command speed to zero. Consequently, any vehicles entering section 1 will be slowed down to one half of its normal speed, and as soon as the vehicle enters section 2, it will brought to a halt before it can enter section 3. Thus the vehicle will be stopped prior to crashing into the stationary obstacle in section 3. It should be noted that if this vehicle stops in section 2 and remains there, it will become a stationary obstacle and will thus trigger a series of reactions for stopping any following vehicles in section 1.

It is to be understood that, although the invention has been described with specific reference to a particular embodiment thereof, it is not to be so limited since changes and alterations therein may be made which are within the full intended scope of this invention as defined by the appended claims.

What is claimed is:

1. Means for controlling the operation of a series of vehicles traveling on a roadway subdivided into a plurality of adjoining sections, said means comprising a separate transmission line in each of said sections, a control unit for each section coupled to the transmission line in that section, each of said units supplying its associated transmission lines with a current to cause the transmission line to radiate signals containing a command frequency for causing any vehicles in the section to travel at a predetermined command speed, obstacle detection means in each of said sections responsive to the presence of any objects in that section and effective to determine the speed at which said object is traveling, each of said obstacle detection means being coupled to the control units in at least one preceding section for controlling the currents supplied to the transmission line, said detection means being effective to actuate said preceding control units to alter the command frequency so as to reduce the command speed in that section and cause all vehicles in said section to slow down.

2. In a system for controlling the operation of a series of vehicles traveling on a roadway subdivided into a plurality of adjoining sections, a separate transmission line in each of said sections, a control unit for each section coupled to the transmission line in the section, each of said control units supplying its associated transmission line with a current to cause the transmission line to radiate signals containing a command frequency for regulating the speed of any vehicles in the section to a predetermined command speed, voltage-responsive frequency control means in each control unit for varying said command frequency, obstacle detection means in each of said sections responsive to the presence and speed of any objects in that section and effective to produce an electrical output in accordance with the speed at which said object is traveling, each of said obstacle detection means having an output connected to the control units in at least a pair of preceding sections whereby said electrical output will vary said command frequencies supplied to said transmission lines, in the event there is a stationary obstacle in one of said sections the detection means in that section being effective to actuate said preceding control units to cause all vehicles in the first preceding section to stop and to reduce the command speed in the other preceding section.

3. Means for controlling the operation of a series of vehicles traveling on a roadway subdivided into a plurality of adjoining sections, said means comprising a separate transmission line in each of said sections arranged to define the path the vehicles are to follow, separate control units for each section operatively connected with the transmission line therein to supply a current thereto that will cause a signal to be radiated that contains a command frequency for causing any vehicles in the section to travel at a predetermined command speed, voltage-responsive frequency control means in each control unit for varying said command frequency, obstacle detection means in each of said sections responsive to the presence of any objects in that section and effective to determine the speed at which said object is traveling and to produce an electrical output in accordance therewith, each of said obstacle detection means being connected to said frequency control means in the control unit in at least one succeeding section whenever an object passes a detection means in excess of said command speed, said electrical output being effective to actuate said frequency control means in said succeeding section to increase said command frequency in said succeeding section to modify the operation of any vehicles therein to prevent them from being overtaken by said obstacle.

4. Means for controlling the operation of a series of vehicles traveling on a roadway subdivided into a plurality of adjoining sections, said means comprising a separate transmission line in each of said sections, a control unit for each section coupled to the transmission line in that section, each of said control units supplying its associated transmission line with a current to cause its transmission line to radiate signals containing a command frequency for controlling the speed of any vehicles in the section, frequency control means in each control unit for altering said command frequency in response to an electrical signal, stationary obstacle detection means in each of said sections for sensing the presence of any objects in said section and adapted to produce an electrical signal in response thereto, moving obstacle detection means in each of said sections for measuring the speed of any objects traveling through said section and adapted to produce an electrical signal in response thereto, both of said obstacle detection means being connected to said frequency control means in the control units in surrounding sections whereby said electrical signals are effective to alter the command frequencies to thereby control any vehicles in such sections to avoid a collision with said obstacle.

5. Means for controlling the operation of a series of vehicles traveling on a roadway subdivided into a plurality of adjoining sections, said means comprising a separate transmission line in each of said sections, a control unit for each section coupled to the transmission line in that section, each of said control units supplying its associated transmission line with a current to cause the transmission line to radiate signals containing a command frequency for controlling the speed of any vehicles in the section, stationary obstacle detection means in each of said sections for sensing the presence of any objects in said section, moving obstacle detection means in each of said sections for measuring the speed of any objects traveling through said section and producing an electrical signal in response thereto, both of said obstacle detection means being coupled to the control units in surrounding sections to modify the radiated signals to thereby control any vehicles in such sections to avoid a collision with said obstacle, switching means connected in circuit with said stationary obstacle detection means, said switching means also being connected to said moving obstacle detection means whereby said electrical signal from said moving obstacle detection means is effective to inactivate said stationary obstacle detection means whenever there is a moving obstacle in the section.

6. The combination of claim 4 wherein said stationary obstacle detection means include a pair of receiving lines extending along opposite sides of said transmission line to receive the radiations from said transmission line whereby respective signals are induced therein and means for sensing any relative changes in said signals resulting from the presence of an object.

7. The combination of claim 4 wherein said moving obstacle detection means include means for causing said transmission line to radiate a high frequency signal that will excite any vehicles in proximity thereto and thus cause a signal to be re-radiated to said transmission line and means for determining the amount of frequency shift in the received signal resulting from movement of the vehicle relative to the transmission line.

8. In a system for controlling vehicles traveling along a roadway which is divided into a plurality of adjoining blocks, a transmission line in each block positioned to define the desired path for vehicles, a separate high-frequency oscillator connected to the transmission line in each block establishing a high-frequency field along the desired path a separate low-frequency oscillator connected to the transmission line in each block and generating a command speed signal, control means included in said low-frequency oscillator and altering the operation thereof and varying said command speed signal when energized, a pair of balanced receiving lines in each block positioned in said high-frequency field adjacent said transmission line, first detection means connected to said receiving lines and producing a first output when said high-frequency field is disturbed such that unequal signals are induced in said pair of receiving lines, second detection means connected to said transmission line and responsive to signals near the frequency of said high-frequency oscillator, said second detection means producing a second output corresponding to signals which are shifted in frequency due to re-radiation from moving vehicles, coupling means connecting said first detection means to the control means in at least one preceding block whereby said first output will energize said control means to alter said command speed signal, switching means included in said coupling means and connected to said second detection means to receive said second output, said switching means being opened by said second output, filter means connected to said second detection means to receive said second output and producing a third output when the second output indicates a vehicle speed less than a reference value, and coupling means connecting said filter means to the control means in at least one preceding block whereby said third output will energize said control means to alter said command speed signal.

9. In a system for controlling vehicles traveling along a roadway which is divided into a plurality of adjoining blocks, a transmission line in each block positioned to define the desired path for vehicles, a separate high-frequency oscillator connected to the transmission line in each block to establish a high-frequency field along the desired path, a separate low-frequency oscillator for each block generating a command speed signal, frequency control means included in said low-frequency oscillator and altering the frequency thereof to vary said command speed signal when energized, each of said low-frequency oscillators being connected to the transmission line in the respective block through a first switch, a pair of balanced receiving lines in each block positioned in said high-frequency field adjacent said transmission line, first detection means connected to said receiving lines and producing a first output when said high-frequency field is disturbed such that unequal signals are induced in said pair of receiving lines, second detection means connected to said transmission line and responsive to signals near the frequency of said high-frequency oscillator, said second detection means producing a second output corresponding to signals which are shifted in frequency due to re-radiation from moving vehicles, coupling means connecting said first detection means to said first switch in the first preceding block and to the frequency control means in a second preceding block, said first output being effective to open said first switch to remove said command speed signal in said first preceding block and effective to energize said frequency control means and alter said command speed signal in said second preceding block, a second switch included in said coupling means and connected to said second detection means to receive said second output, said second switch being opened by said second output, filter means connected to said second detection means to receive said second output and producing a third output when the second output indicates a vehicle speed less than a reference value, and second coupling means connecting said filter means to the frequency control means in at least one preceding block whereby said third output will energize said frequency control means to alter said command speed signal.

References Cited in the file of this patent
UNITED STATES PATENTS

| | | |
|---|---|---|
| 2,402,464 | Suter | June 18, 1946 |
| 2,424,263 | Woodyard | July 22, 1947 |
| 2,629,865 | Barker | Feb. 24, 1953 |
| 2,656,002 | Keeton et al. | Oct. 20, 1953 |
| 2,661,070 | Ferrill | Dec. 1, 1953 |
| 2,698,377 | Korman | Dec. 28, 1954 |
| 2,699,834 | O'Brien | Jan. 18, 1955 |
| 2,804,160 | Rashid | Aug. 27, 1957 |
| 2,847,080 | Zworykin et al. | Aug. 12, 1958 |
| 2,859,435 | Auer et al. | Nov. 4, 1958 |

OTHER REFERENCES

Publication: "Popular Science," May 1958, pages 75, 76, 77, 78, 79, 226, 227.